Patented Oct. 7, 1941

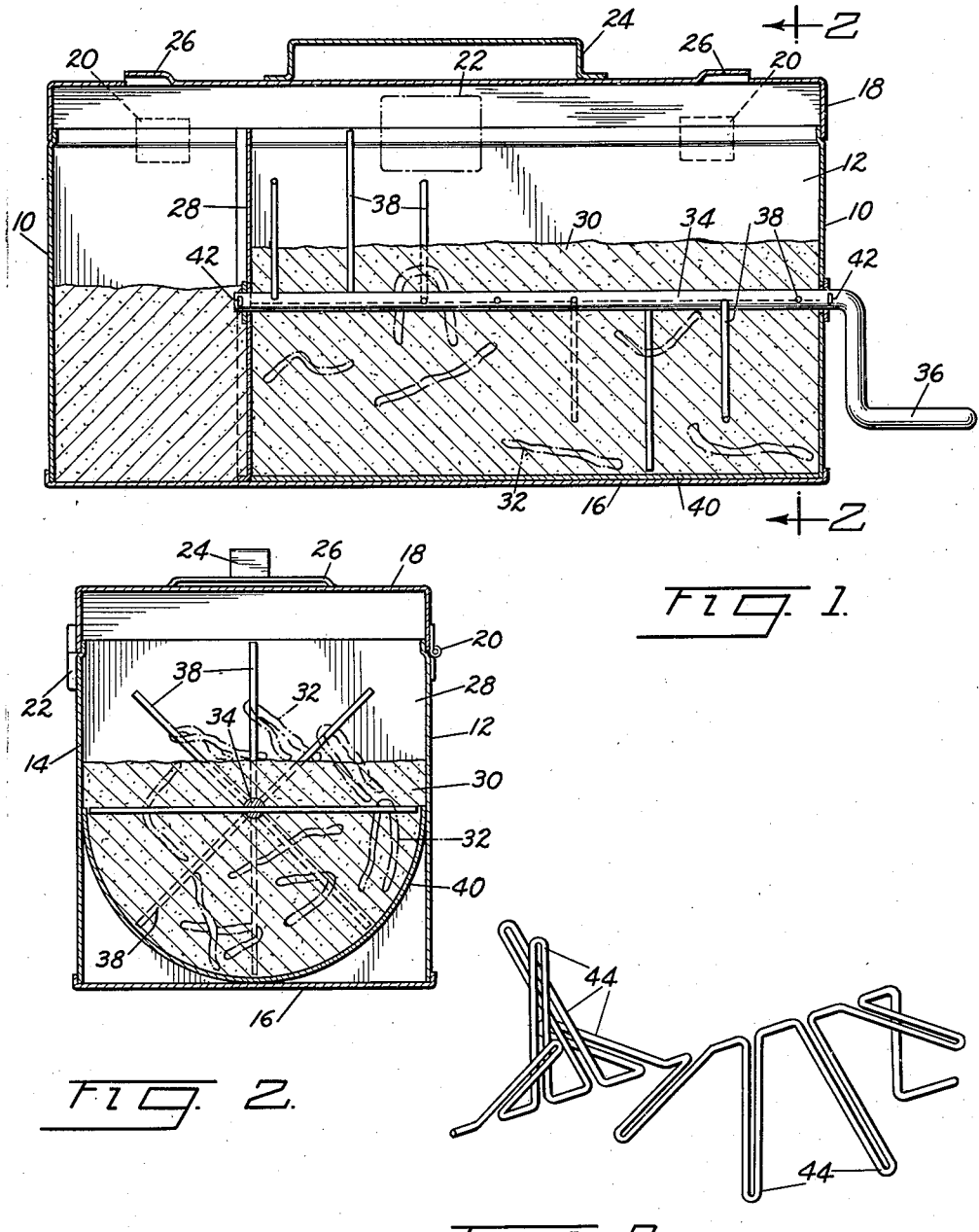

2,257,879

UNITED STATES PATENT OFFICE 2,257,879

BAIT BOX

George M. Graham, Detroit, Mich., assignor to Hinckley-Myers Company, Jackson, Mich., a corporation of Michigan Application October 9, 1940, Serial No. 360,474

5 Claims. (Cl. 43—55)

This invention relates to an improved bait box for use by fishermen.

The object is to provide a bait box particularly designed for live worms or other similar live bait. Such live bait is ordinarily kept in earth or other loose granular material. In the ordinary bait box the live worms tend to ball up at the bottom of the box in a mass and it is inconvenient to segregate a single specimen for use. This balling up of the worms renders them less active and they are not so desirable for use as bait after being kept in the box for a substantial period of time.

This invention relates to a bait box which has a bait containing compartment adapted to carry a granular or other material within which the live bait is kept and provided with lifting means adapted to be actuated to elevate a single specimen from the bottom of the compartment and from within the granular material to the upper portion of the compartment and above such material whereby the specimen is readily accessible to the fisherman.

The lifting means also serves as an agitator or stirring member adapted to stir up the granular material and to maintain the bait scattered throughout such material rather than balling up in the bottom of the compartment. The box shown is also provided with a second compartment which may contain dry sand. When a specimen of live bait is removed from the first compartment it may be dropped into the sand compartment. Powdering the specimen with the sand renders it less slimy and more easily usable as a bait.

Other objects, advantages and meritorious features of this improved bait box will more fully appear from the following description, appended claims, and accompanying drawing, wherein:

Figure 1 is a vertical sectional view through a bait box embodying this invention, Fig. 2 is a vertical sectional view taken on line 2—2 of Fig. 1, Fig. 3 is a perspective of a lifting element of a modified design as compared with the lifting element shown in the box illustrated in Figs. 1 and 2.

In the embodiment of the invention shown in the drawing a bait box is illustrated having end walls 10, back wall 12, front wall 14, a bottom 16, and a cover 18 hinged to one of the side walls at 20 and provided with a catch 22 to releasably engage the front wall in any convenient manner. The cover is fitted with a handle 24 and ventilation louvres 26.

The bait box is divided into two compartments by a partition 28. Each compartment is adapted to contain granular or other similar material and also bait. The box is designed primarily for carrying live bait such as fish worms. In Figs. 1 and 2 a granular material such as earth 30 is shown in the large compartment and worms 32 are shown therein. The other compartment, being the small one, is adapted to contain dry sand. If a worm is removed from the earth in the large compartment it may be dropped in the dry sand compartment so as to remove the slime and render it more easily handled.

Lifting means in the form of a crank like element 34 extends through the large compartment and is rotatably supported therein. It is supported at one end within the partition 28 and at the opposite end in end wall 10. The type of rotating crank shown in Figs. 1 and 2 comprises a shaft provided at one end with a crank handle 36. A series of arms or pins 38 extend through the shaft and project radially in opposite directions. Several of these arms are shown. This large compartment is provided with an interior bottom wall 40 which is arcuate shaped so that the arms 38 travel over the wall upon the rotation of the crank shaft. Pins 42 are provided to position the shaft within its bearings.

When worms are kept within the earthy granular material 30 in the large compartment rotation of the crank causes the arms 38 to travel through the granular material within the lower portion of the compartment and to lift the worms therefrom above the level of the earthy material into the top of the compartment. The granular material fills the compartment only a little over half way up so that there is a clear space above the granular material through which the arms rotate. This rotation of the crank lifts individual worms up into this clear space where they are readily accessible. The crank may be rotated continuously in one direction or it may be oscillated. An oscillating member would serve the purpose. Rotation of the lifting element at intervals also prevents the bait from becoming balled up in the bottom of the compartment and distributes it throughout the earthy contents of the compartment.

The particular type of lifting element shown in Figs. 1 and 2 involves a shaft through which arms 38 extend. One lifting element might be formed of a single wire bent to provide a series of radially projecting arms 44 as shown in Fig. 3. This wire also constitutes the shaft. One end would be inserted through the partition 38 and the crank end through the end wall of the box as shown.

What I claim is:

1. A bait box provided with a compartment for granular material and live worms, lifting means rotatably supported within said compartment and adapted to sweep through the granular material within the lower portion of the compartment and into the upper portion thereof above the granular material upon rotation of the means.

2. A bait box provided with a compartment for granular material within which live worms may be kept, lifting means rotatably supported within said compartment and provided with a plurality of worm lifting portions projecting radially from the axis of rotation and spaced apart axially therealong adapted upon rotation of the means to be swept rotatably through the granular material in the lower portion of the compartment and into the upper portion of the compartment above such granular material.

3. A bait box provided with a compartment for granular material and bait, said compartment having an arcuate bottom wall, lifting means rotatably supported within said compartment and provided with a plurality of radially projecting arms spaced apart longitudinally along and circumferentially about the axis of rotation and adapted upon rotation of the means to swing over said bottom wall and through the granular material within the lower portion of the compartment into the upper portion of the compartment above the granular material.

4. A bait box provided with a compartment for granular material and bait, said compartment having an arcuate bottom wall, lifting means rotatably supported at opposite ends within opposite end walls of the compartment, said lifting means provided with radially projecting arms adapted upon rotation of said means to swing over said bottom wall through the granular material within the lower portion of the compartment and into the upper portion of the compartment above said granular material, one end of said lifting means projecting through an end wall of the compartment and provided therebeyond with a handle.

5. A bait box provided with a partition separating the same into two compartments, each compartment adapted to contain granular material and bait, lifting means extending through one compartment and rotatably supported at one end in the partition and at the opposite end in the end wall of the compartment, said lifting means being provided with arms adapted upon swinging movement of the means to swing through the granular material within the lower portion of the compartment and into the upper portion of the compartment above said granular material, said box being provided with a cover.

GEORGE M. GRAHAM.